United States Patent [19]
Chieng et al.

[11] Patent Number: 6,035,346
[45] Date of Patent: Mar. 7, 2000

[54] METHOD AND APPARATUS TO REPROGRAM FLASH ROM WITHOUT PROXY CODE

[75] Inventors: Darrell L. Chieng, Cypress; Paul J. Muraski, Spring; Alvin F. Givens, Houston, all of Tex.

[73] Assignee: Compaq Computer Corporation, Houston, Tex.

[21] Appl. No.: 08/962,813

[22] Filed: Nov. 3, 1997

[51] Int. Cl.[7] .................................................. G06F 13/00
[52] U.S. Cl. ............................ 710/10; 710/2; 710/102; 710/104; 713/2
[58] Field of Search ................................ 713/1–2, 100; 714/55; 710/1–4, 8–21, 62–74, 100–106, 129–131

[56] References Cited

U.S. PATENT DOCUMENTS

| 5,109,506 | 4/1992 | Begun ........................................ 714/55 |
| 5,544,303 | 8/1996 | Maroteaux et al. ..................... 395/326 |
| 5,680,288 | 10/1997 | Carey et al. ............................ 361/118 |
| 5,754,870 | 5/1998 | Pollard et al. .......................... 713/320 |
| 5,854,905 | 12/1998 | Garney .................................... 395/284 |
| 5,859,987 | 1/1999 | Gillespie et al. ....................... 395/308 |
| 5,875,310 | 2/1999 | Buckland et al. ...................... 395/306 |
| 5,875,313 | 2/1999 | Sescila, III et al. .................... 395/309 |
| 5,881,281 | 3/1999 | Gates et al. ................................ 713/1 |
| 5,889,970 | 3/1999 | Horan et al. ............................ 710/126 |
| 5,898,869 | 4/1999 | Anderson .................................... 713/2 |

*Primary Examiner*—Christopher B. Shin
*Attorney, Agent, or Firm*—Sharp, Comfort & Merrett, P.C.

[57] ABSTRACT

By allowing a host processor to control an intelligent Peripheral Component Interface (PCI) device's reset logic, the PCI device's programmable read only memory (also known as PROM, EEPROM, or FLASH EEPROM) can be reprogrammed without storing any reprogramming instructions (also known as PROXY code) in the PROM itself. During reprogramming operations the host processor commands the PCI device into a reset-and-hold mode. During this time the host processor downloads reprogramming instructions and replacement code into the PCI's random access memory. When released from reset, the PCI device executes the reprogramming code downloaded by the host processor.

3 Claims, 8 Drawing Sheets

METHOD AND APPARATUS TO REPROGRAM FLASH ROM WITHOUT PROXY CODE

BACKGROUND OF THE INVENTION

This invention relates to computer systems adapted to use the Peripheral Component Interface (PCI) bus and, more specifically, to a computer system employing a PCI adapter card containing programmable read only memory.

As shown in FIG. 1, a computer system 100 configured to use the PCI architecture includes a host processor 105, memory 110, a Processor-PCI bridge circuit 115, and one or more PCI devices 120. Internal host processor buses 125 are used to communicate information among the computer system's different elements. The PCI bus 130 is used to communicate information between the processor 105 or memory 110 and the PCI device 120. The computer system 100 could, for example, be one element in a larger system comprising video displays, keyboards, print devices, network connections, and graphical input/output devices.

Illustrative host processors 105 include the 80X86 family of processors and the PENTIUM and PENTIUM PRO processors, all manufactured by Intel Corporation. Memory 110 typically includes random access memory (RAM), read only memory (ROM), and at least one type of permanent storage device such as an electromagnetic tape, electromagnetic fixed and/or floppy disk, and/or an optical disk unit. Typical PCI devices include ethernet controller cards, disk array controller cards, video controller cards, and Small Computer System Interface (SCSI) bus adapter cards.

A PCI device 120 is frequently embodied on a separate PCI card (referred to as a PCI adapter card or, more simply, adapter card) that plugs into the computer system's PCI bus 130. As shown in FIG. 2, an adapter card 120 may itself have a central processing unit (CPU) 200, programmable ROM (PROM) 205, RAM 210, and a connector 215 through which signals are transmitted (via the adapter's local bus 220) to and from a host processor 105 (not shown in FIG. 2).

The terms "host processor" and "CPU" are adopted here as a convenient means to distinguish the processor (105) controlling the host computer system (100) and the processor (200) controlling the adapter card (120). In fact, either processor may be implemented with any suitable microprocessor such as the 80X86, PENTIUM or PENTIUM PRO processors from Intel Corporation, or the 680X0 or POWER PC processors from Motorola Corporation. Further, the host processor 105 and CPU 200 can be configured to execute any convenient operating system, for example, DOS or WINDOWS 95 from Microsoft Corporation, or UNIX.

When a computer system 100 having a PCI bus architecture first powers up, the host processor 105 locates the PCI bus 130 and determines the existence and type of any PCI device present. A PCI device 120 is nonresponsive to memory and input/output (I/O) space addressing on the PCI bus 130 until the configuration space of the PCI device is programmed by the host processor 105.

Following detection of a PCI device, the host processor 105 allocates memory and I/O space for the PCI device and, using the PCI standard's defined configuration protocol, programs the configuration space of the PCI device with the addresses of the memory and I/O space allocated to the PCI device. Following configuration the PCI device may be assigned memory and/or I/O space and can then respond to memory and I/O space bus cycles accordingly.

Many adapter cards use ROM that is capable of being reprogrammed. This type of memory is known as programmable ROM (PROM), electrically erasable programmable ROM (EEPROM), or FLASH EEPROM. The ability of the adapter card 120 to reprogram itself facilitates upgrading the card's operation or correcting errors ("bugs") in the card's operational software (stored in PROM 200).

As shown in FIG. 3, adapter PROM 205 can be divided into a boot block 300 and an operational code block 305. The boot block 300 contains code that is needed to initialize the adapter's CPU 200, and reprogram the PROM's operational code block 305. The set of instructions executed by the adapter's CPU 200 to reprogram the PROM 205 is referred to as PROXY code. The operational code block 305 contains the code that implements the adapter's function.

During adapter initialization the CPU 200 executes the instructions stored in the boot block 300, see FIG. 4. First the CPU interrogates its RAM 400 and sets the adapter's PCI configuration register(s) 405 in accordance with the PCI standard. Next, the CPU checks to see if the PROM's content is intact 410. This is typically done via a cyclic redundancy code (CRC) check. If the PROM's CRC test passes, the adapter's operational code 305 is copied into RAM 415 after which the CPU idles until commanded by the processor 420. If the CRC test fails at step 410, the CPU copies the boot block's communication and reprogramming (PROXY) code into RAM 425 and then waits for the host processor 105 to send it new program code 430, i.e., a new set of operational instructions. When the new instructions are received from the host processor, the adapter replaces the PROM's operational code block 305 with the newly downloaded instructions 435 in accordance with the boot block's reprogramming code. PROM reprogramming is now complete and the adapter can be reset in preparation for executing the newly stored instructions.

During reprogramming, if an error appears in the PROM's boot block 300 where the reprogramming or communication code is stored, the adapter cannot be reprogrammed in the field by the adapter's end-user/purchaser. Should an image (the code contained in the PROM's 205 operational code block 305) be downloaded and fail to function properly, the end-user may have no way/capability to reprogram the device. Should power be interrupted during a reprogramming event (see FIG. 4, step 435), the code image downloaded from the host processor may be so corrupted that the adapter card cannot initialize itself.

SUMMARY OF THE INVENTION

In general, the invention features an adapter card having its own processor that can be commanded to reprogram its control memory from an external processor. Control memory is where the adapter card's boot and operational instructions are stored and is typically implemented in programmable read only memory (PROM). Boot instructions allow the adapter's processor to establish the adapter card's state upon power-up and reset operations. Operational instructions allow the adapter card to perform its designated task, e.g., act as a video controller card. The external processor commands the adapter card's processor to enter a hold state after which it downloads both reprogramming instructions and substitute operational instructions. When released from the hold state, the adapter card's processor executes the downloaded reprogramming instructions which, typically, result in storing the downloaded substitute operational instructions in the control memory—replacing any operational instructions that may have previously been stored.

Among the advantages of the invention are one or more of the following. An adapter card which receives reprogramming instructions from an external source is not susceptible to reprogramming instruction errors present at the time of manufacture.

DESCRIPTION OF THE PREFERRED EMBODIMENTS

By allowing a host processor to control the Peripheral Component Interface (PCI) device's reset logic, the PCI device's programmable read only memory (PROM) can be reprogrammed without storing any reprogramming (or host-to-PCI device communication) instructions in the PCI device's PROM.

Figure 1:
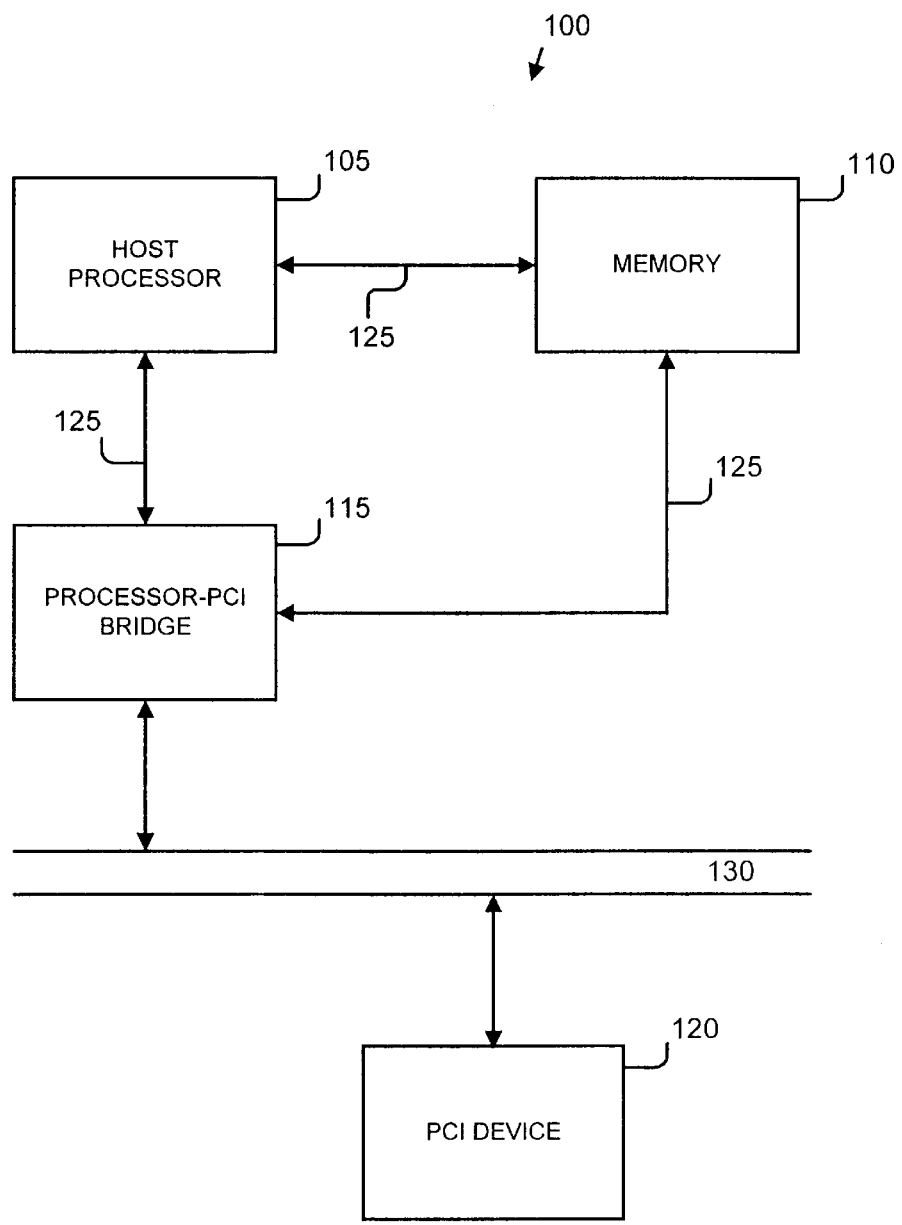
FIG. 1 is a block diagram of a computer system utilizing a Peripheral Component Interface (PCI) bus architecture.
Figure 2:
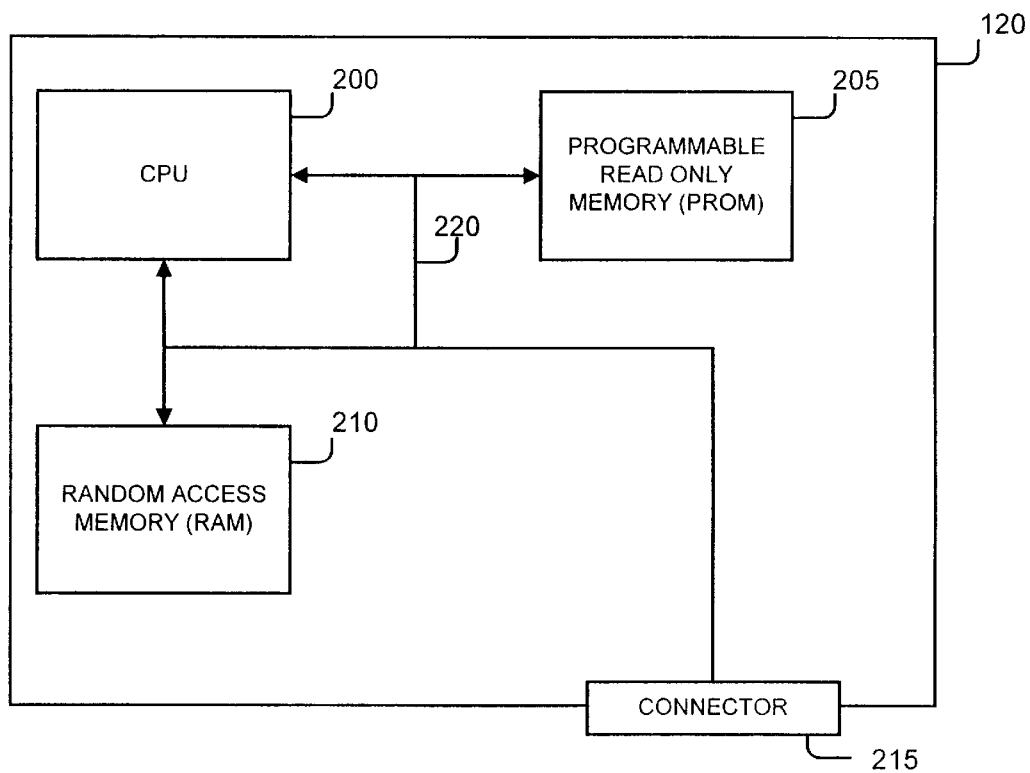
FIG. 2 is a block diagram of a PCI adapter card device.
Figure 3:
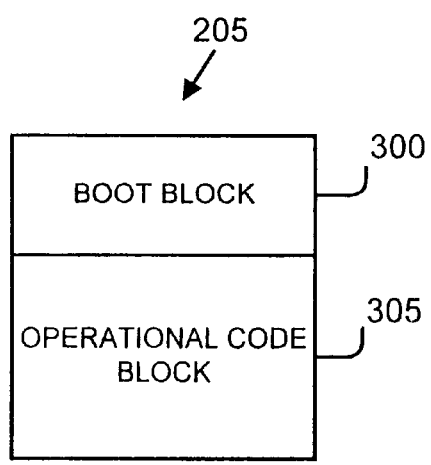
FIG. 3 is a block diagram of a programmable read only memory device.
Figure 4:
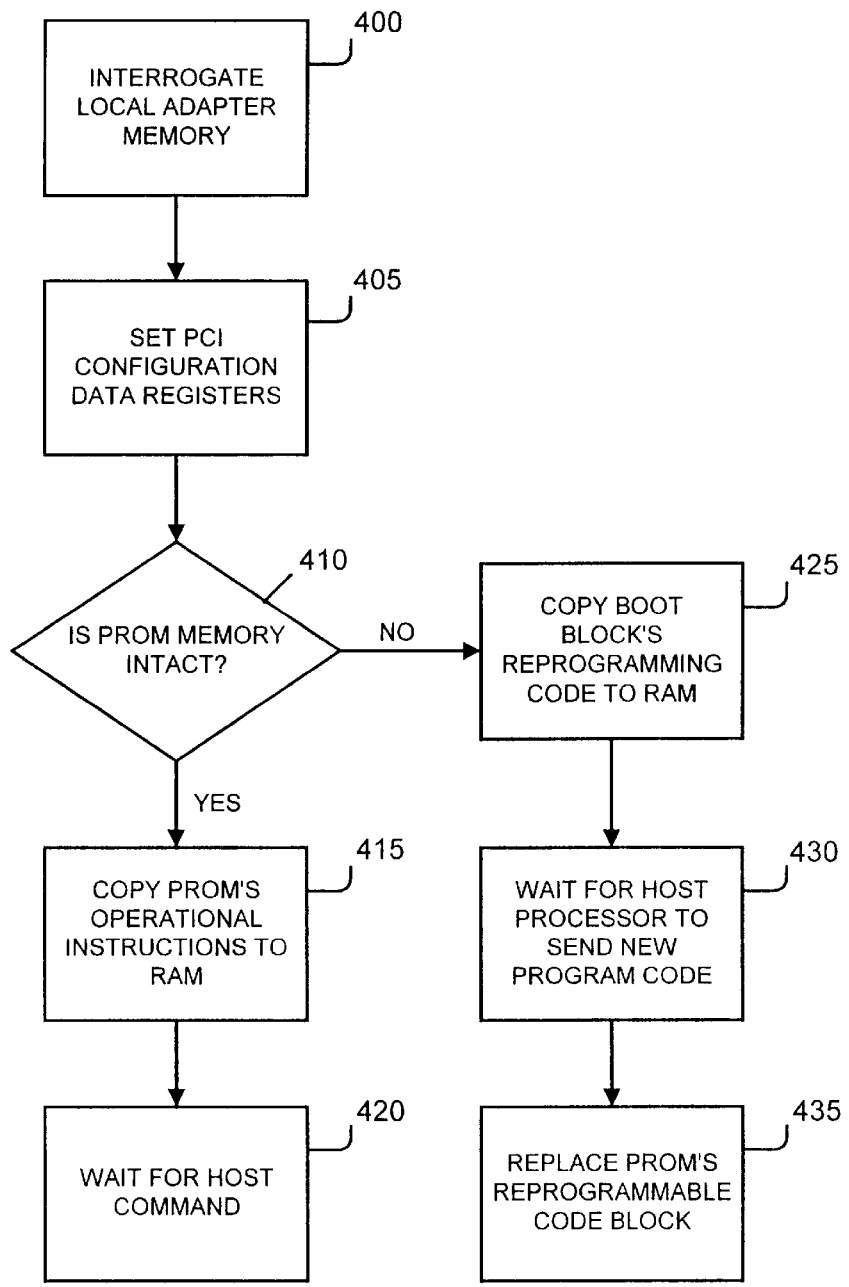
FIG. 4 illustrates a PCI device's initialization sequence.
Figure 5:
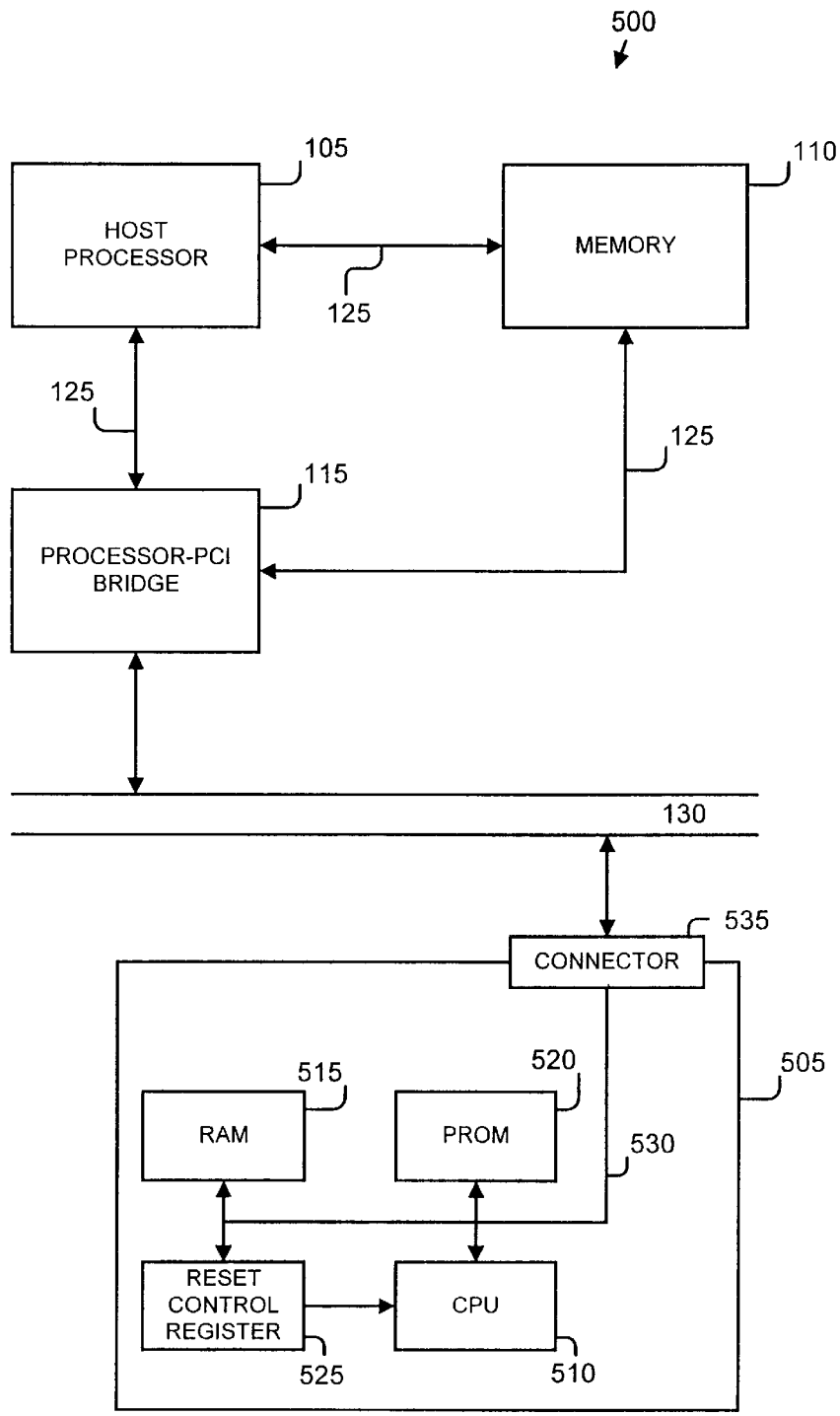
FIG. 5 shows is a block diagram of a computer system.
Figure 6:
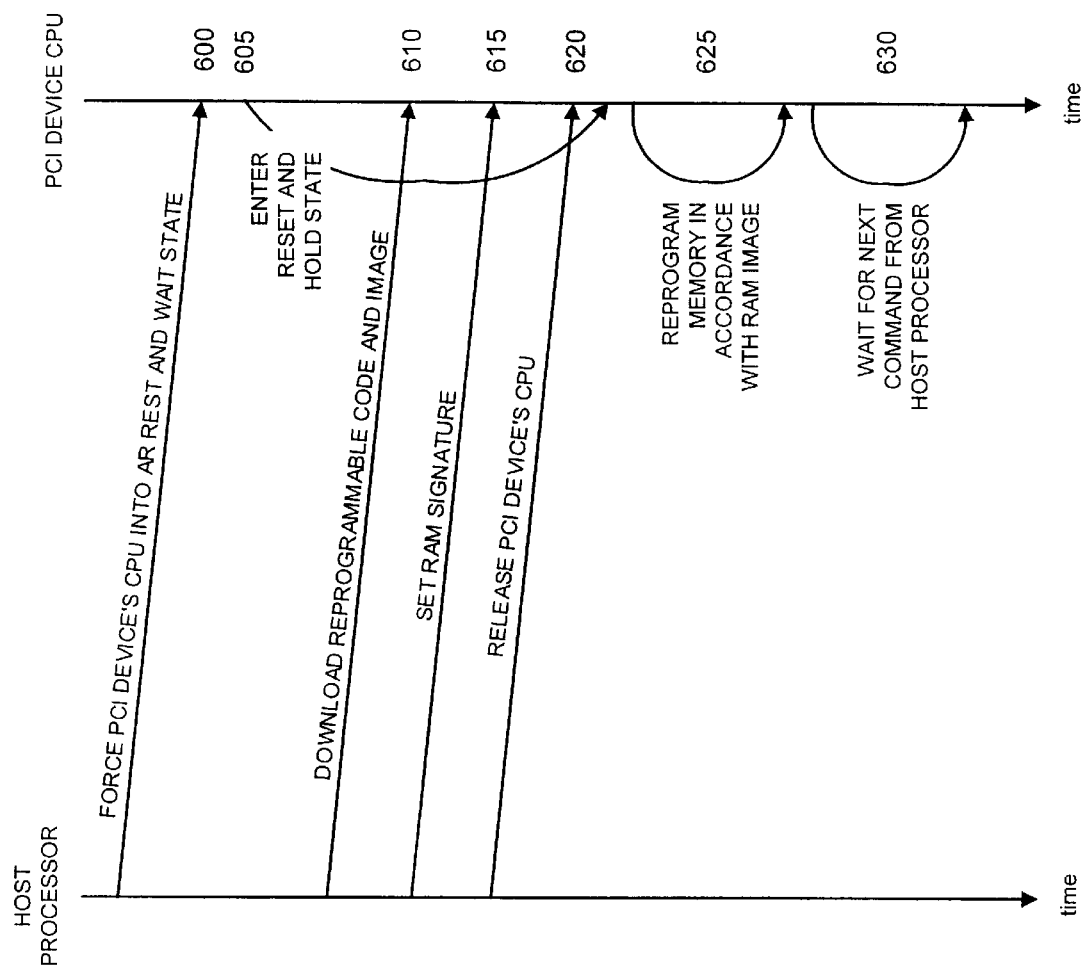
FIG. 6 illustrates the invention's reprogramming steps.

FIG. 5 shows, in block diagram form, a computer system 500 having a PCI device 505 (also referred to as an adapter card). The PCI device 505 includes a CPU 510, RAM 515, PROM 520, a reset control register 525, internal communication bus(es) 530, and a connector 535. The sequence of events to reprogram the PCI device's 505 PROM 520 is shown in FIG. 6. At step 600 the host processor 105 commands the PCI device's CPU 510 into a reset state. The PCI device 505 responds by entering a reset and hold state at step 605. Next, the host processor 105 downloads the necessary reprogramming code and image (the operational instructions and, possibly, other data to be stored in the device's PROM 520) into the device's RAM 515 at step 610. At step 615 the host processor 105 initializes a memory signature in the device's RAM 515 that indicates the CPU 510 is to execute a reprogramming operation. Following memory signature initialization, the host processor 105 releases the CPU 510 from the hold/wait state at step 620. After release, the CPU 510 executes instructions from the PROM's 520 boot block. The boot block instructs the CPU 510 to look in RAM 515 for the signature pattern. If the signature pattern is found, the CPU 510 executes the previously downloaded reprogramming code (see step 610) at step 625. When PROM 520 reprogramming is complete, the PCI device 505 waits for the host processor's 105 next command at step 630. If the CPU 510 does not find the signature pattern in its specified location in RAM 515, the CPU 510 continues to boot up in a standard manner. An important aspect of the invention is that the PCI device's PROM 520 does not contain reprogramming (or communication) instructions—PROXY code.

The host processor 105 can force the PCI device's CPU 510 into a wait and hold state by writing to a special hardware register called the reset control register 525. As shown in FIG. 5, the reset control register 525 is accessible from the PCI device's local bus 530 and to the host processor via the connector 535. The reset control register is also connected to one or more of the CPU's 510 reset pins. Since, at initialization time, the PCI device has only one memory mapped PCI window and it must be used to map into the device's local RAM, the reset control register is dynamically appended into the device's memory space. The device's RAM address space is then mapped (including the resent control register) into the host processor's PCI memory space.

Figure 7:
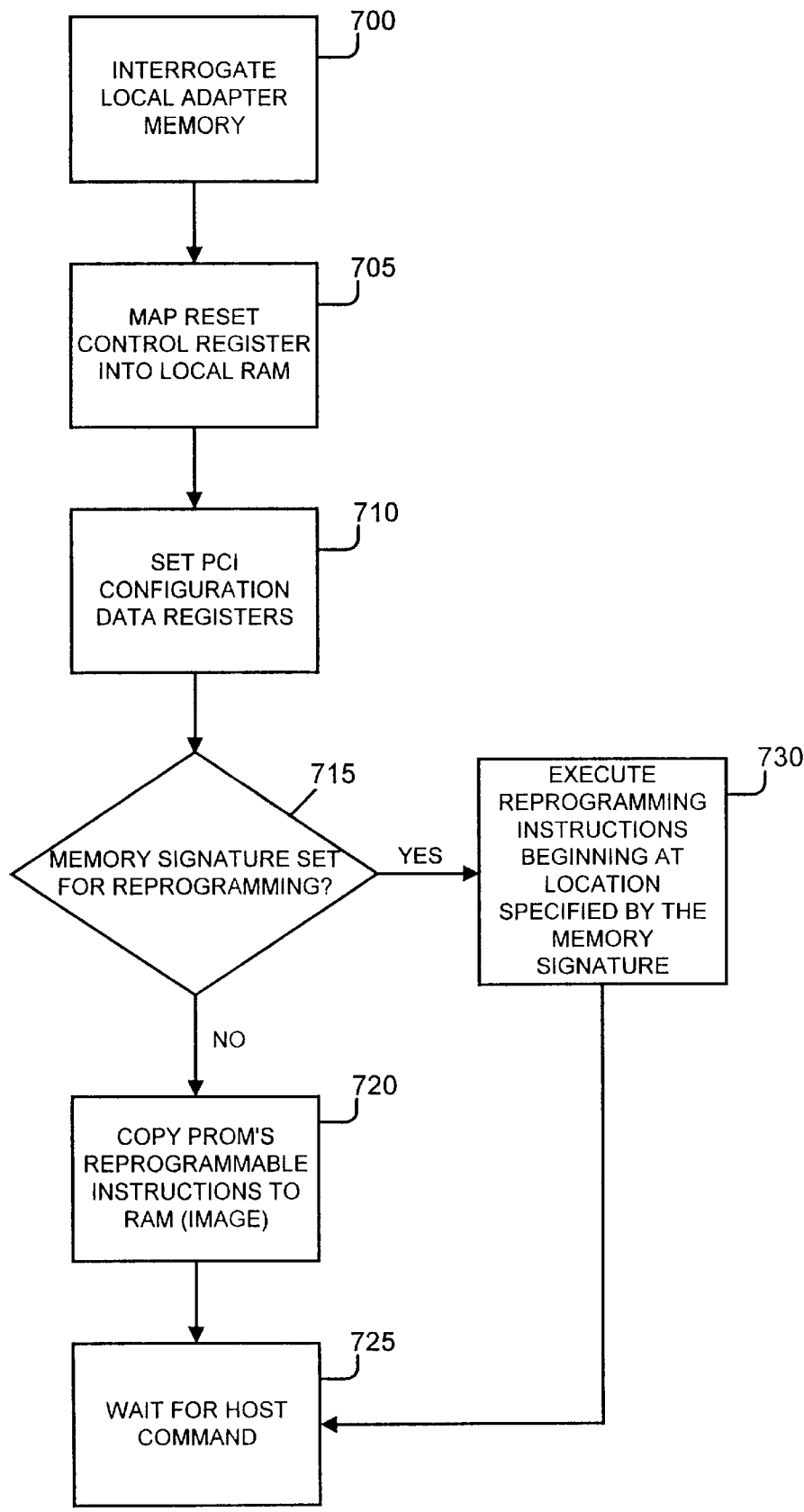
FIG. 7 shows a PCI device's reset/initialization sequence.

FIG. 7 outlines the steps taken by the PCI device 505 once the host processor has released it from the reset state, i.e., after steps 600 through 620 of FIG. 6. Initialization comprises four steps: (1) interrogating local RAM 515 at step 700; (2) mapping the reset control register 525 into the device's local memory space at step 705; (3) setting the device's PCI configuration so that the host processor 105 can recognize it at step 710; and (4) interrogating RAM 515 for a specified signature pattern at step 715. If the memory signature indicates that no reprogramming is to be done, then the PROM's operational code block is copied into the RAM 515 at step 720 and the device waits for the host's next command at step 725.

If, on the other hand, the memory signature indicates that reprogramming is to be performed, then the CPU 510 begins executing instructions from RAM 515 at a location specified by the host processor via the memory signature, step 730. Upon completion of reprogramming, the device 505 waits for the host's next command at step 725. (The memory signature can be any convenient pattern, but should be one that is not likely to occur upon memory reset. The precise pattern, its location in RAM, and its semantic content is specified by the initialization code stored in the PROM's 520 boot block.)

Figure 8:
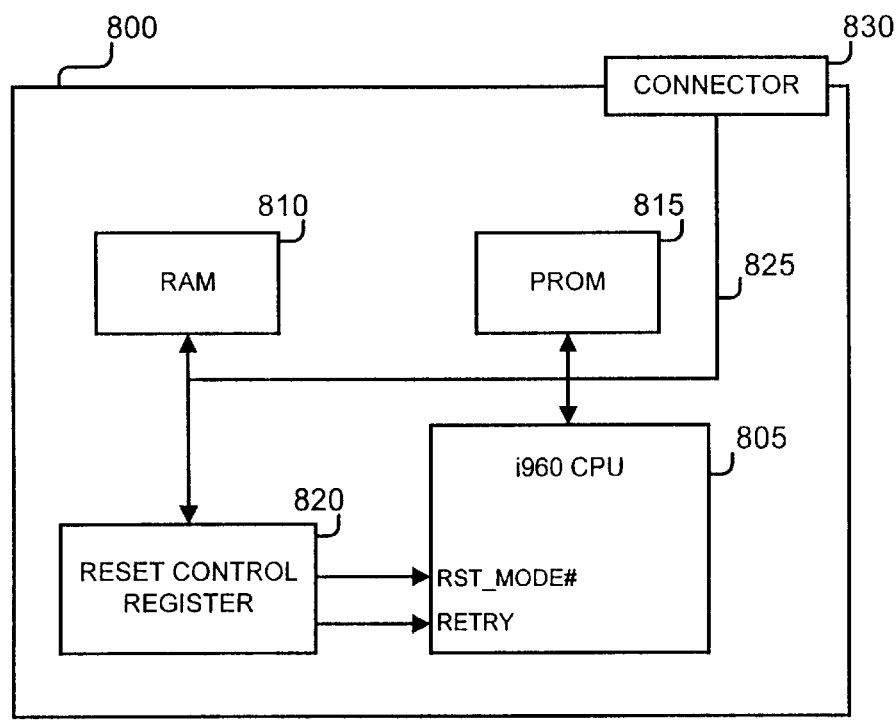
FIG. 8 is a block diagram of a PCI device.

In the PCI ethernet network interface card (NIC) 800, shown in FIG. 8, an i960 CPU 805 from the Intel Corporation is used as the adapter card's central processing unit. Four megabytes (MB) RAM 810 and 2 MB of programmable ROM (PROM) 815 are also used. The reset control register 820 is a hardware register having two of its bits connected to the i960's RST_MODE# and RETRY reset pins. The host processor controls the CPU's 805 reset state by writing to those reset control register positions connected to the RST_MODE# and RETRY pins and by selectively asserting and deasserting the i960's primary reset control signal, P_RST# in accordance with the i960 specifications. If both the RST_MODE# and RETRY signals are asserted, the i960 805 initializes in an ordinary fashion. (This is the default, or normal mode of operations.) If the RST_MODE# signal is asserted and the RETRY signal is not asserted, the i960 805 is held in reset mode until released by the host processor (via signal P_RST#). In this mode the host processor can download data (via connector 835 and bus 825) into the PCI device's RAM 810 and set the memory signature. (Downloaded data includes reprogramming instructions and instructions that will replace the PROM's 815 operational code block.) When the host processor releases the i960 CPU 805, processing continues in accordance with step 730 in FIG. 7.

Other embodiments are within the scope of the following claims. For example, the PCI device can use any convenient processor capable of being held in a reset state. Further, the invention is not restricted to use in a PCI architecture, but can be used in any system in which intelligent adapter cards (devices utilizing an on-card processor) need to be reprogrammed in real-time and which can have their on-board memory and processor controlled by an external host processor. Method steps according to the invention may be performed by a computer processor executing instructions organized, e.g., into a program module to operate on input data and to generate output. Storage devices suitable for tangibly embodying computer program instructions include all forms of non-volatile memory including, but not limited to: semiconductor memory devices such as EPROM, EEPROM, and flash devices; magnetic disks (both fixed, floppy, and removable); other magnetic media such as tape; and optical media such as CD-ROM disks. Any of the foregoing may be supplemented by, or incorporated in, specially-designed application-specific integrated circuits (ASICs).

What is claimed is:

1. A method for reprogramming boot instructions in an adapter card in a computer system, said adapter card having an adapter card processor, a RAM memory and reprogrammable read only memory, said computer system having a host processor and a peripheral bus, the method comprising:

causing, by the host processor, the adapter card processor to enter a reset mode;

downloading, by the host processor, reprogramming boot instructions to the RAM memory on the adapter card via the peripheral bus;

downloading, by the host processor, substitute boot program instructions to the RAM memory on the adapter card via the peripheral bus;

downloading, by the host processor, a memory signature pattern into the RAM memory via the peripheral bus;

releasing, by the host processor, the adapter card processor from the reset mode; and executing, by the adapter card processor, the downloaded boot reprogramming instructions and reprogramming the boot instructions in said reprogrammable ready only memory;

wherein causing said adapter card processor to enter a reset mode is achieved by writing a reset command to a reset control register on the adapter card; and wherein said adapter card processor looks at said RAM memory for the memory signature pattern.

2. The method of claim 1 wherein the memory device is a flash electrically erasable programmable read only memory device.

3. The method of claim 1 wherein the peripheral bus is a Peripheral Component Interface bus.

* * * * *